UNITED STATES PATENT OFFICE.

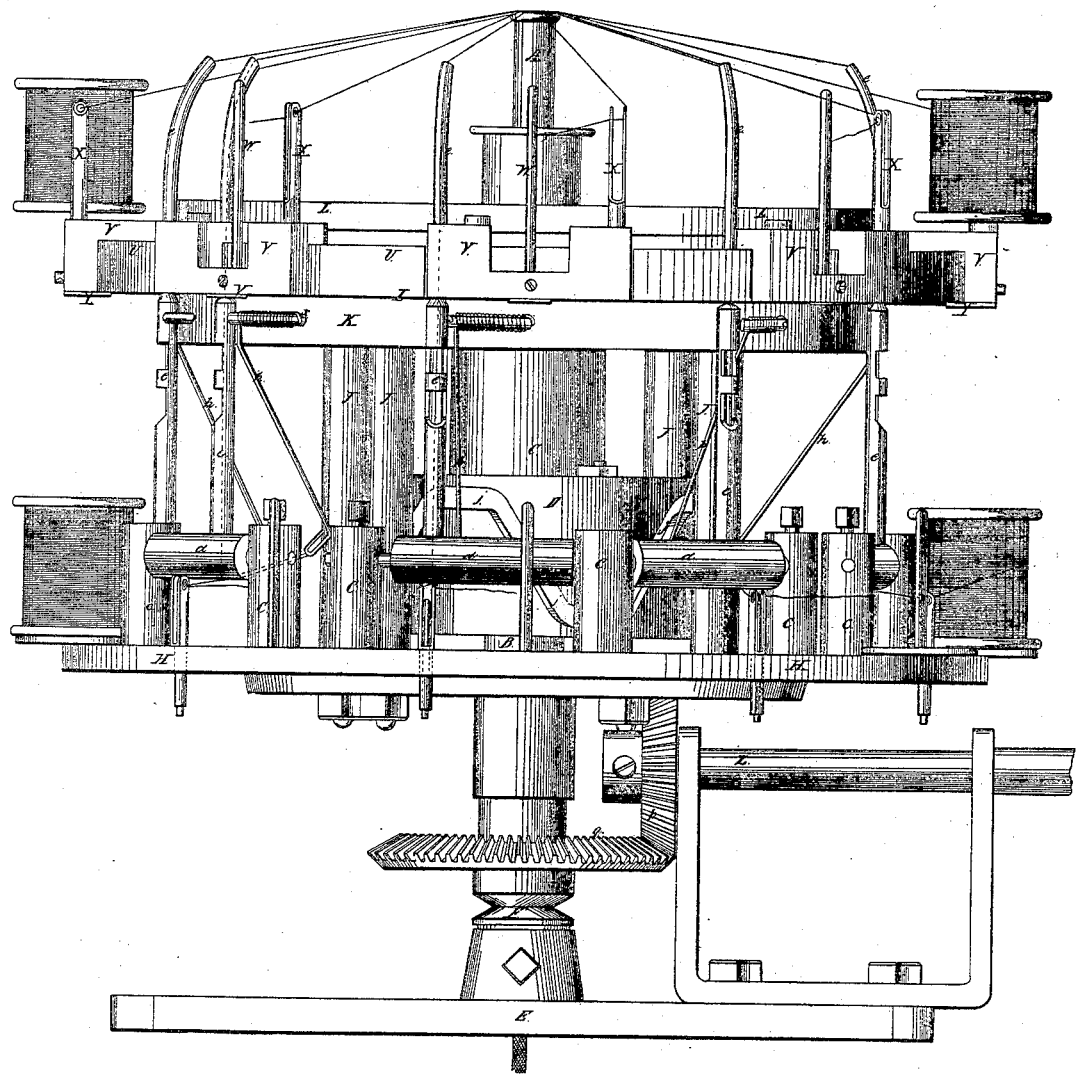

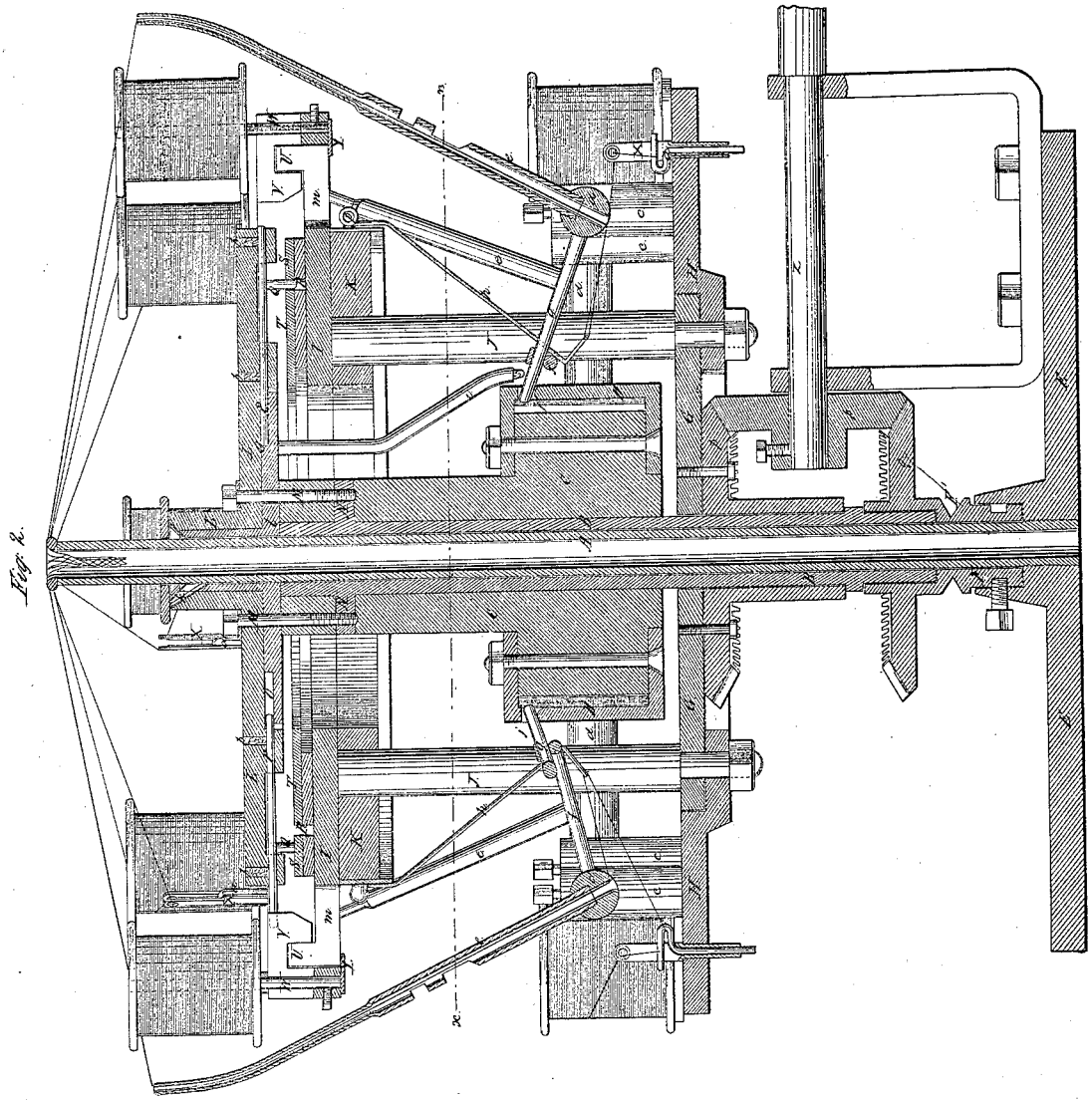

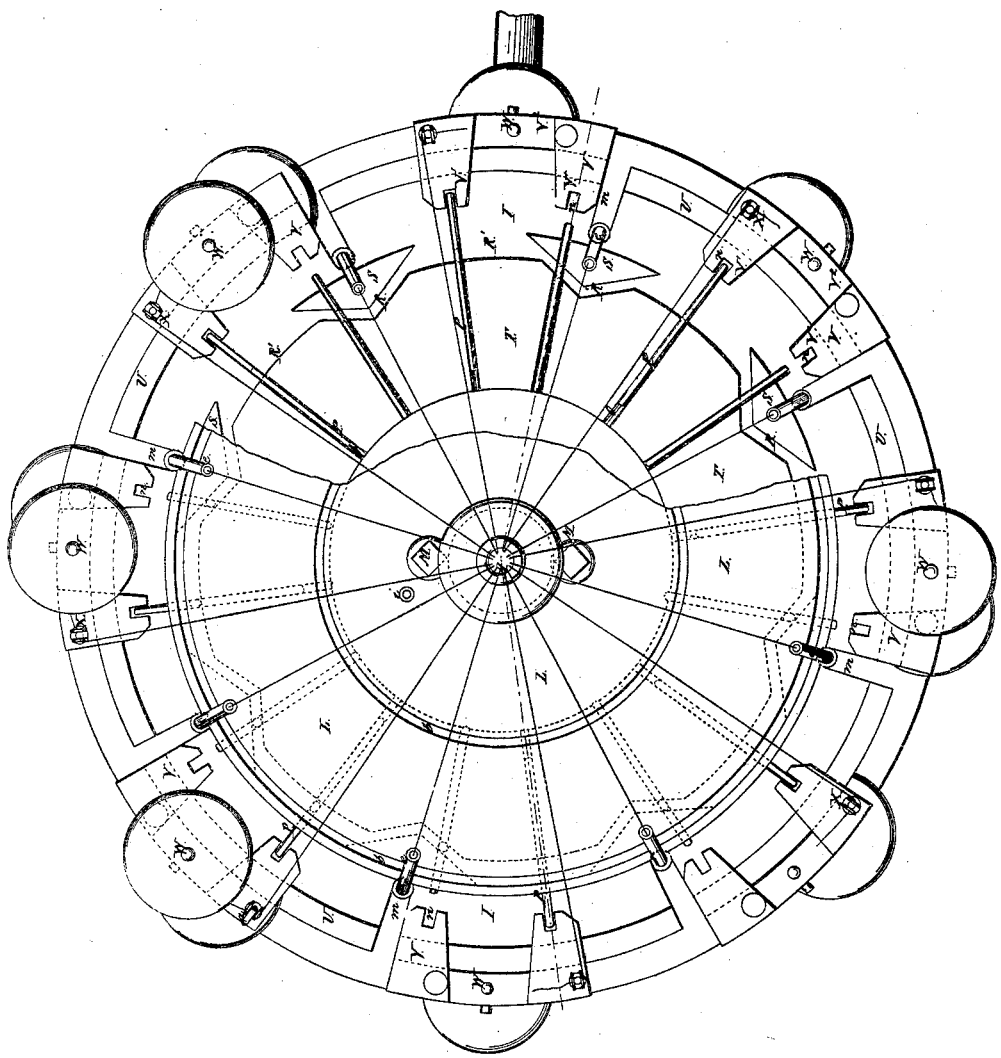

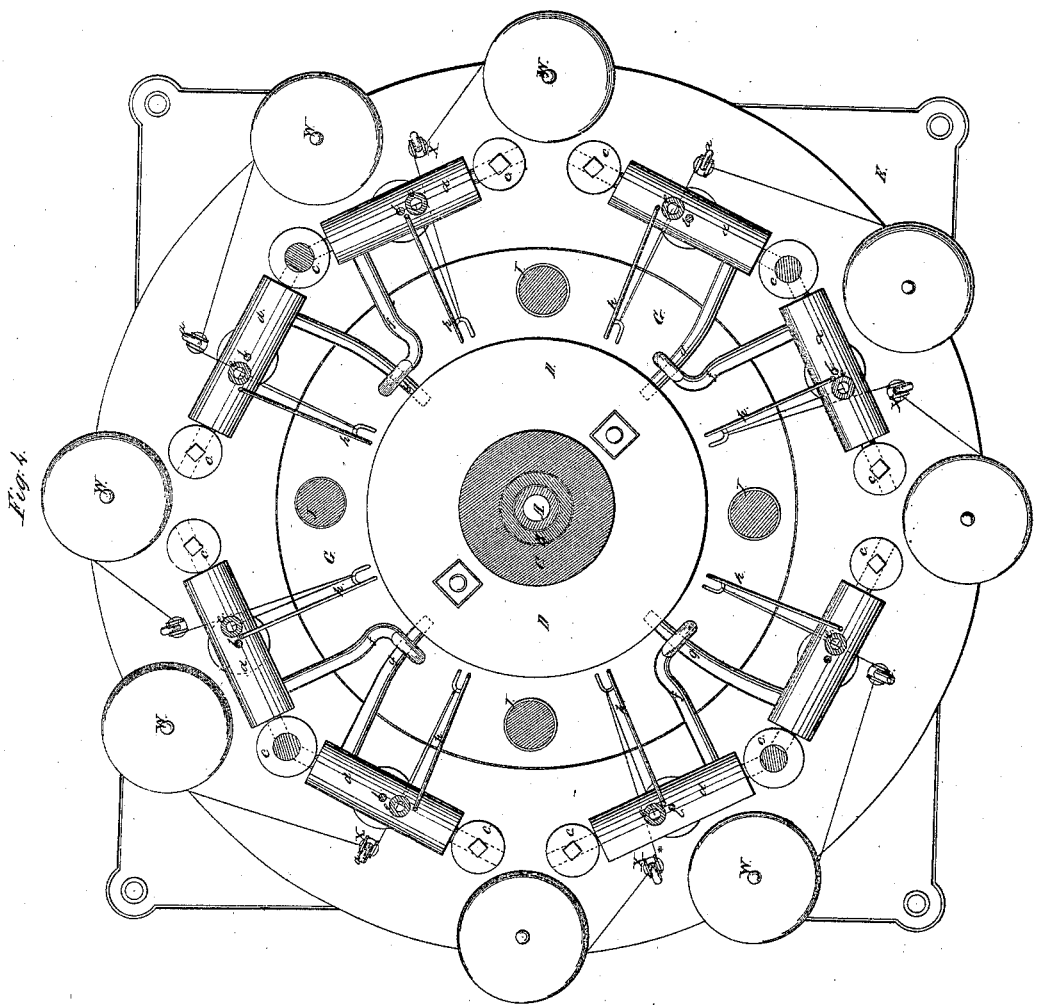

WILLIAM DARKER, OF WEST PHILADELPHIA, ASSIGNOR TO HIMSELF AND JOSIAH B. THOMPSON, OF PHILADELPHIA, PENNSYLVANIA.

IMPROVEMENT IN BRAIDING-MACHINES.

Specification forming part of Letters Patent No. 57,435, dated August 21, 1866.

*To all whom it may concern:*

Be it known that I, WILLIAM DARKER, of West Philadelphia, in the county of Philadelphia and State of Pennsylvania, have invented a new and useful Improvement in Braiding-Machines; and I do hereby declare that the following is a full, clear, and exact description thereof, which will enable others skilled in the art to make and use the same, reference being had to the accompanying drawings, forming part of this specification, in which—

Figure 1, Sheet 1, is an elevation of a braiding-machine made according to my invention. Fig. 2, Sheet 2, is an axial section thereof. Fig. 3, Sheet No. 3, is a top view. Fig. 4, Sheet 4, is a horizontal section in the plane indicated by the red line $x$, Fig. 2.

Similar letters of reference indicate like parts.

The object of this invention is an improvement in braiding-machines, by means whereof such machines may be successfully worked much faster than has hitherto been possible, as will be hereinafter more fully described.

In my improvement the carriers of the upper series of bobbins are carried on the race at its circumference and are driven by radial bolts, which are moved backward and forward by means of cam-grooves entering holes in the carriers, and being withdrawn successively in time to skip the tubes as the latter pass inside.

E is a bed-plate, which supports the mechanism about to be described. On one side of the bed-plate are placed standards, which support a driving-shaft, Z, on whose inner end is fixed a bevel-gear wheel, $p$, which drives the horizontal bevel-gears $q$ and $r$ in opposite directions.

The bevel-gear $q$ is placed on the upper end of a hollow vertical shaft, F, which runs in a socket made for it in the top of a boss at the center of bed-plate E.

The upper end of shaft F is made of greater diameter than its lower end to enable it to receive the bottom end of a hollow shaft, B, to which it is permanently attached, which shaft B extends up to the disk or top plate L, which is fixed to it by means of screws M, that pass down through the top of said disk through a wooden casing that surrounds the shaft B into a circular flange, N, extending from said shaft.

The bottom of the hollow shaft B rests on a shoulder within the hollow shaft F, so that their inner sides are flush with each other below such shoulder.

A is a tube placed within shafts B and F, its lower end being screwed through the center of the bed-plate E, and its upper end extending above the top of shaft B.

The upper bevel horizontal gear, $r$, is fixed to a central horizontal plate, G, fitted loosely around shaft B and supported by its edge upon the inner rim of an annular horizontal plate, H, which supports the lower series of bobbins. These plates G and H are rigidly connected to each other by means of bolts, which are continuations of standards J, hereinafter mentioned, and which bolts pass through the laps of the plates and have nuts on their ends below plate H.

The standards J extend from the top of plate H, on which plate their unreduced portions or shoulders rest, up to the race-plate I, with which they are permanently connected, thereby making a permanent connection between the race-plate I, the plates G and H, and the bevel-gear $r$.

The race-plate is protected by a wooden casing, K, from whose periphery extend arms $s$, which carry the coiled ends of wire springs $h$, whose free ends reach downward and inward, as shown in Figs. 1, 2, and 4. Their office is to take up the slack of the thread of the lower bobbins, as hereinafter explained, and they are equal in number to the lower bobbins, so that each lower bobbin has such a spring.

The upper part of the wooden casing K is itself covered by a metallic plate, T, along whose circumference are formed a series of angular cam-grooves, R, in conjunction with sectional plates S of triangular form. Such grooves extend down into the wooden casing in order to give sufficient depth thereto.

The disk or top plate, L, has a neck, L′, that surrounds the tube A, a sleeve or gland, $t$, of anti-friction metal being interposed between them, such sleeve or gland being expanded below the disk into an annular plate, which is interposed between the disk and the wooden casing C and rigidly connected to both by the screws M, before mentioned.

That part of the race-plate which extends in diameter beyond the circumference of the disk L above it, and which also extends beyond the circumference of the wooden casing K, is designated by the letter m, and said part has a vertical flange, U, raised on and extending all around its outer edge, for the purpose of carrying the sliding carriages V, that hold the upper bobbins.

The shape of the carriages V is seen in Figs. 1, 2, and 3. They are composed of two solid blocks, V', connected to each other by a curtain, V², which comes outside of the part m of the race-plate, being curved so as to conform thereto, as are also the blocks V' and the grooves on their under sides, which fit over the said flange U. The upper bobbins are sustained on said carriages by means of spindles W, which are passed up through holes made in the curtains V², and are held in place by means of set-screws. Each spindle W has a plate, Y, on its lower end, which is brought up snugly against the bottom of the carriage. The inner face of each block V' of the carriages V is slotted, as at n, to receive the ends of sliding bolts P, which are moved in radial directions along the under side of disk L in grooves O, made for them. Said bolts have projections Q, which extend vertically downward into cam-grooves R, which are made on the upper surface of the race-plate, as before mentioned, by means of the sectional triangular plates S and angular recesses made along the circumference of plate T and casing K.

When the bolts are drawn inward by the cams R their forward ends are withdrawn from the slots n of the bobbin-carriages, and when the projections Q of said bolts are carried outward to the line of the periphery R' of the cam-plate T, and while they remain on that line, the outer ends of the bolts are made to engage the said slots n.

To each carriage are assigned two bolts, P, and the distance apart of the bolts of each pair is equal to the distance between the slots n of each bobbin-carriage, and the extent or length of the cams R is arranged with reference to the spaces that separate the slots and bolts, so that when one bolt of a pair is withdrawn the other will have been already projected into engagement with one of the carriages.

The letters b b designate circular concentric grooves sunk into the disk L deep enough to reach the radial grooves O, in which the bolts Preciprocate. Their object is to provide means for the lubrication of the bolts, which, in this example, is accomplished by strands of fibrous material saturated with lubricating material.

One of the blocks V' of each carriage carries a thread or yarn guide, X, which consists of a tube passing through the carriage and opening on its under side. The upper part of the tube is bifurcated, the tops of their forks being perforated to allow the thread of the bobbin of the same carriage to pass through them. Each of said thread-guides is provided with a hooked bolt or detector, a, that is placed within the guide, as shown in the drawings, and is held up near to the top of the perforated forks by the thread, which passes within its hook in going from one fork to the other.

The detecter is of such length that when the strand from a spool is unbroken and the machine is in operation it is held up high enough to clear devices (not here shown) for stopping the machine; but when the thread breaks or a spool or bobbin becomes empty it is allowed to drop and strike a clutch-catch or other suitable device for shipping the driving-belt to the loose pulley or for actuating any suitable stop-motion. The lower series of bobbins has like thread-guides, X, and detecters a, the latter being arranged to drop below the level of the rotating bed-plate H.

The letters c indicate standards, which give support to a series of rock-shafts, d, each of which carries a tubular thread-guide, e, that passes diametrically through the shaft, and extends thence upward past the race-plate and above the forked tops of the thread-guides X. The rock-shafts and tubes are as numerous as the lower bobbins, which latter are set on spindles fixed in the plate H near its edge and outside of the rock-shafts. The rock-shafts and tubular guides are rocked by means of arms g, which extend from alternate rock-shafts and enter a continuous cam-groove, j, made in the periphery of a metallic box, D, which incloses the lower part of the wooden casing C. This box is in shape a hollow cylinder, and it is securely bolted to the casing. The form of said cam-groove j is seen in Fig. 1, its highest and lowest parts being horizontal and connected to each other by diagonal lines.

The ends of the arm g, which work in the cam j, may be provided with friction-rolls to secure their easy movements. In order to lubricate them, I have provided a tube, i, that extends down from the top of disk L to a position where a wick or strand of yarn kept saturated with oil can be brought across the path of the arms g.

The rock-shafts d, which do not carry arms g, are provided with rigid hooks f, that extend from the inner sides of the shafts and severally embrace the arms g of the shafts adjoining them on the right, so as to cause the rock-shafts to be rocked in pairs, whereby a pair of the tubular yarn-carriers, e, are made to move in and out from the action of the same arm g. The rocking of the shafts d is caused by the passage of the arms g along the diagonal portions of the cam-groove j, and the extent of their motions is sufficient to carry the tubular carriers e alternately within and without the path of the carriages which carry the upper spool.

When the carriers e are brought toward the body of the machine they are received in radial slots m, made in the circumference of the race-plate, said slots being of such a depth as to allow the carriers to approach near to the periphery of the disk L, and so clear the inner faces of the carriages V, and when they are moved outward they are taken far enough to clear the outer faces of said carriages.

It will be observed that the lower plates, G H, which in effect compose but one plate, and which carry the lower bobbins, will be rotated with the race-plate in one direction, while the disk L and the cam-box D will be rotated together and in a contrary direction, and that the carriages V, which bear the upper series of bobbins, will travel with the disk L, because they are engaged by the pins or bolts P, said carriages being loosely fitted on the flange U of the rim of the race-plate for the purpose of allowing them to move easily thereon. The bobbin-carriages V are placed at such a distance apart from each other as to give time for the tubular thread-carriers e to enter and leave the slots m without encountering said carriages. In this example I have placed eight bobbins in each series, and consequently there are eight bobbin-carriages V, which move toward the left, and eight tubular thread-carriers e, which, beside their reciprocations in and out, move toward the right. The cam-groove j has four diagonal faces inclined toward the left and four toward the right, so that the arms g complete one upward and one downward movement, and consequently the carriers e make a complete reciprocation in the time it takes one of the bobbin-carriages V to move over one-eighth part of the circumference of the race-plate, which will take them severally past one of the slots m, into which the carriers e are drawn. The threads from the several spools are taken to the top of the fixed tube A, and are led down and held therein by any suitable means—as, for instance, by a weight or by a take-up apparatus operated below the bed-plate E. The threads of the upper spools or bobbins will be carried around in one direction, and those of the lower spools or bobbins will be carried around in the opposite direction; and since the threads of said lower spools are taken alternately within and without the continuous circular path of the threads of the upper bobbins, it follows that the threads of the two series of bobbins will be interlaced after the manner of a braid.

On the shaft F, below the gear-wheel q, is formed a grooved pulley, E', to receive a band for driving the take-up gear. Said pulley may be fitted with numerous indentations for the purpose of producing friction, and so preventing the band (not shown) from slipping thereon.

Having thus described my invention, I claim as new and desire to secure by Letters Patent—

1. The vibrating thread-carriers e, for carrying the threads of the lower set of bobbins, made and arranged substantially as described.

2. The rock-shafts d, their side arms, f g, and the cam j, for rocking the said shafts, substantially as and for the purpose above described.

3. The application to a braiding-machine of the reciprocating bolts P and cams R, for driving the upper set of bobbins, substantially as described.

4. Lubricating the bolts P by means of the circular grooves b (one or more) in the disk L, substantially as described.

5. The lubricating-tube i, suspended from the disk L, for applying a saturated wick to the arms g of the rock-shafts, substantially as described.

WILLIAM DARKER.

Witnesses:
HENRY HESSEL,
CHALKLEY BERRY.